J. B. LARNCE.
BORING BIT.
APPLICATION FILED JUNE 14, 1912.

1,063,982.

Patented June 10, 1913.

John B. Larnce,
Inventor

Witnesses by C. A. Snow & Co.,
Attorneys

UNITED STATES PATENT OFFICE.

JOHN B. LARNCE, OF BEAUMONT, TEXAS, ASSIGNOR OF ONE-HALF TO S. L. TOWNSEND AND AUBREY R. KEITH, OF BEAUMONT, TEXAS.

BORING-BIT.

1,063,982.  Specification of Letters Patent.  Patented June 10, 1913.

Application filed June 14, 1912. Serial No. 703,724.

*To all whom it may concern:*

Be it known that I, JOHN B. LARNCE, a citizen of the United States, residing at Beaumont, in the county of Jefferson and State of Texas, have invented a new and useful Boring-Bit, of which the following is a specification.

The device forming the subject-matter of this application is adapted to be employed for mineral boring, and the invention aims to provide a boring drill, the cutting elements of which are adapted to cut beyond the periphery of the head, and to sweep the material transversely, in overlapped relation, thereby to fashion a cylindrical hole in the material, at the center of which hole a core is located.

The invention aims further to provide novel means for connecting the constituent members of the head so as to provide novel means for assembling the head with a driving element.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
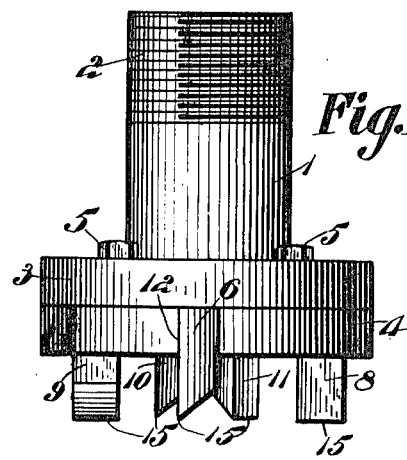
Figure 2:
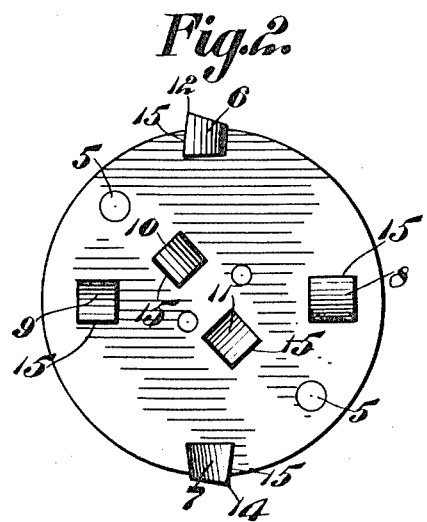

In the accompanying drawings,—Figure 1 shows the invention in side elevation; and Fig. 2 is a bottom plan.

In carrying out the invention there is provided a head, comprising a post 1, which may be threaded exteriorly as indicated at 2 for connection with a driving element. The post 1 is connected at its lower end with a disk 3, which preferably is of circular contour and of equal thickness throughout its extent. Located below the disk 3 is a registering plate 4, of the same peripheral contour as the disk 3. The plate 4 is secured to the disk 3 through the instrumentality of bolt and nut connections 5. Depending below the plate 4 and secured thereto in any desired manner are cutting bits which are denoted by the numerals 6, 7, 8, 9, 10 and 11. The bits 6 and 7 constitute one series of cutters, the bits 6 and 7 being located at the periphery of the plate 4. The bit 6 is equipped with an upright cutting edge 12 which projects beyond the periphery of the plate 4, and the bit 7 is provided with an upright cutting edge 14 which likewise is located beyond the periphery of the head 4. Located between the periphery of the plate 4 and the center of the plate are the bits 8 and 9, which constitute a second series, the third series of bits, represented by the elements 10 and 11, being located inwardly of the bits 8 and 9.

All of the several bits are provided at their lower edges with cutting edges 15, disposed at right angles to the cutting edges 12 and 14 of the bits 6 and 7, respectively. The cutting edges 15 of the several series of bits, 6—7, 8—9, and 10—11 are so positioned that when the structure is rotated, these cutting edges 15 will sweep the bottom of the hole in overlapped relation, thereby forming a cylindrical opening in the material, at the center of which opening a core, represented by the material left between the bits 10 and 11, upstands. In practice it has been found that this central core will crumble away readily.

As will be clearly understood, the upright edges 14 and 12 of the bits 7 and 6, respectively, serve to clear the periphery of the opening, and to prevent a binding of the head, represented by the elements 3 and 4.

The device is of few parts and will serve to bore a hole with a minimum expenditure of the driving force.

Having thus described the invention what is claimed is:—

1. In a boring drill, a post, adapted to be connected to a source of power, and having its lower end formed into a disk of uniform thickness; a corresponding registering plate of approximately the same thickness secured to said disk; nut and bolt connections securing the plate to said disk; said plate being provided with three series of cutting bits, one of said series having vertically disposed cutting edges which fall beyond the outer periphery of said plate; another series of cutting bits falling within the path traversed by the first mentioned bits, the third series of bits falling within the path traversed by said second mentioned bits, said bits being thus so arranged in relation to each other that the cutting edges of each series of bits will come into contact with a different part of the bottom of the hole being drilled, except at the immediate center thereof.

2. In a boring drill, a post adapted to be connected to a source of power, and having its lower end formed into a disk of uniform thickness; a corresponding registering plate of approximately the same thickness secured to said disk; nut and bolt connections securing the plate to said disk; said plate being provided with cutting bits arranged in series, one series having vertically disposed cutting edges extended beyond the outer periphery of said plate, two other series arranged within the first mentioned series, the cutting edges of which come in contact with a different part of the bottom of the hole being drilled, except at the immediate center thereof, all of said bits provided with horizontal cutting edges.

3. In a device of the class described, a plate having a transverse opening in its periphery; a post independent of the plate and provided at one end with a disk superposed upon the plate and projecting beyond the periphery of the post, the disk constituting a closure for one end of the opening; a securing device uniting the plate and the disk, and constituting the sole plate engaging element in the disk, the securing device being located between the periphery of the post and the periphery of the disk and being accessible from the top of the disk; and a bit abutting against the plate and located in the opening.

In testimony that I claim the foregoing as my own, I have hereto affixed my signature in the presence of two witnesses.

JOHN ╳ B. LARNCE.
his mark

Witnesses:
J. A. BELLAR,
A. R. KEITH.